Jan. 26, 1960   F. GERMANO ET AL   2,922,629
CARBURETOR
Filed May 16, 1958   6 Sheets-Sheet 3
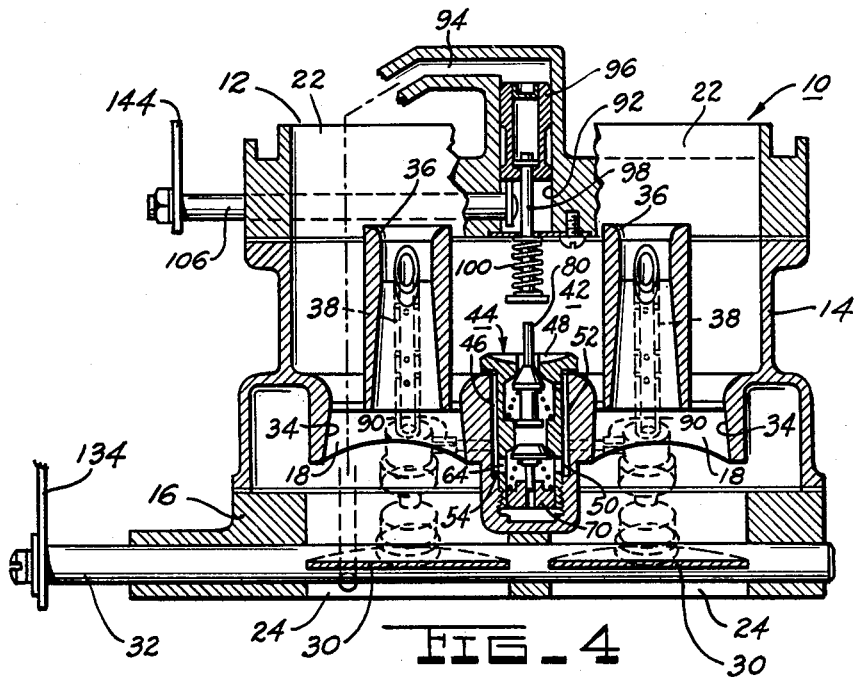
FIG_4
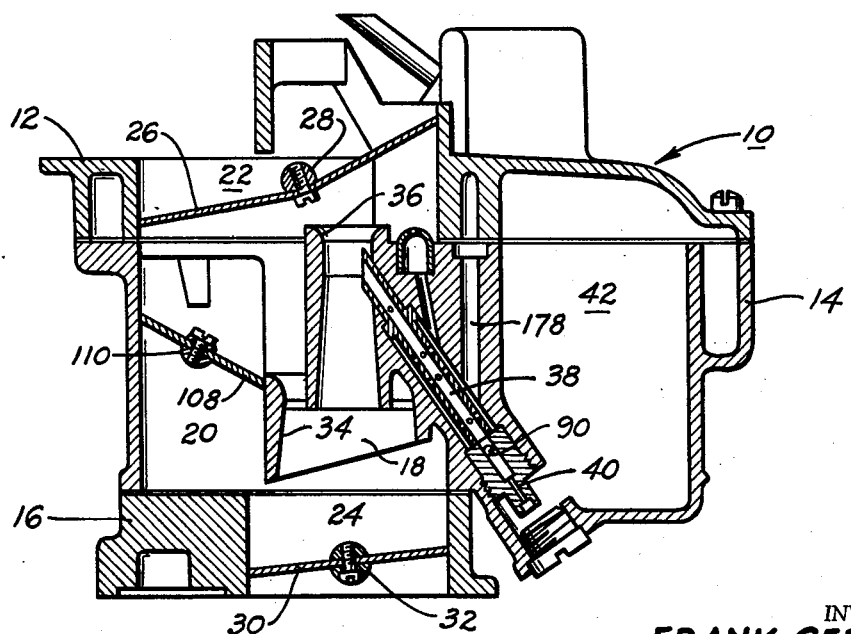
FIG_5
INVENTORS
FRANK GERMANO
ALBERT H. WINKLER
BY
James L. O'Brien
ATTORNEY.

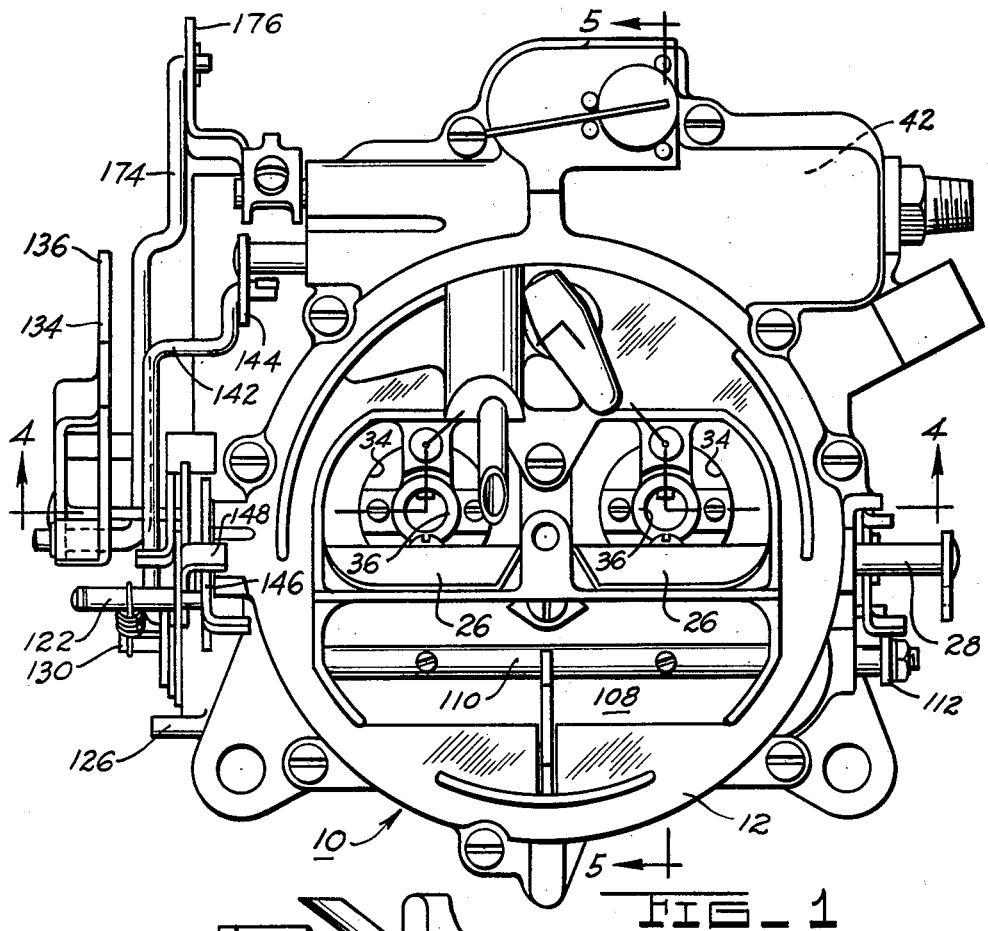
FIG_1
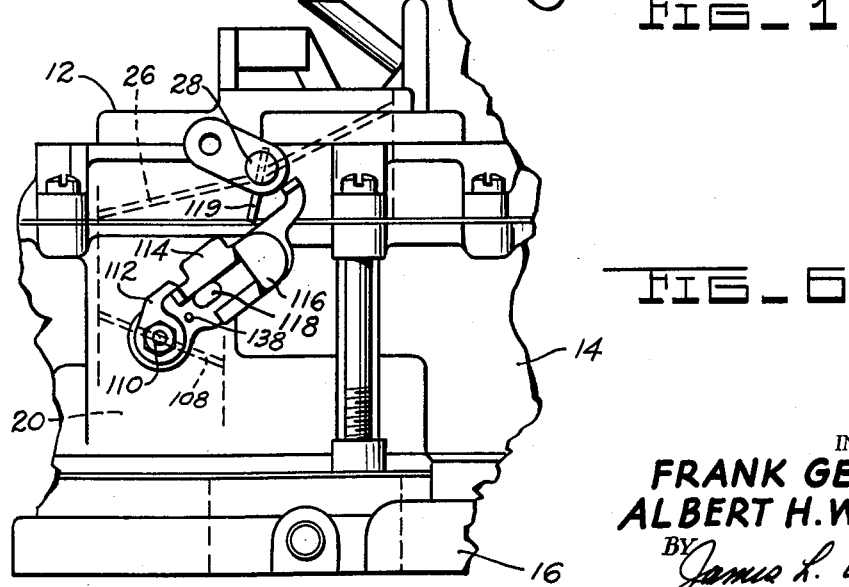
FIG_5
INVENTORS
FRANK GERMANO
ALBERT H. WINKLER
BY James L. O'Brien
ATTORNEY.

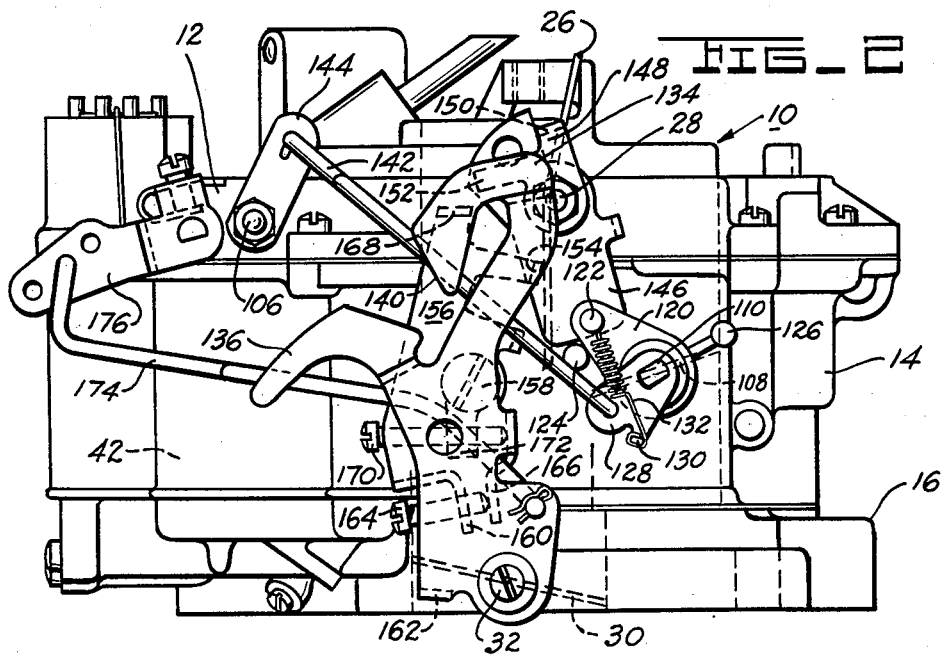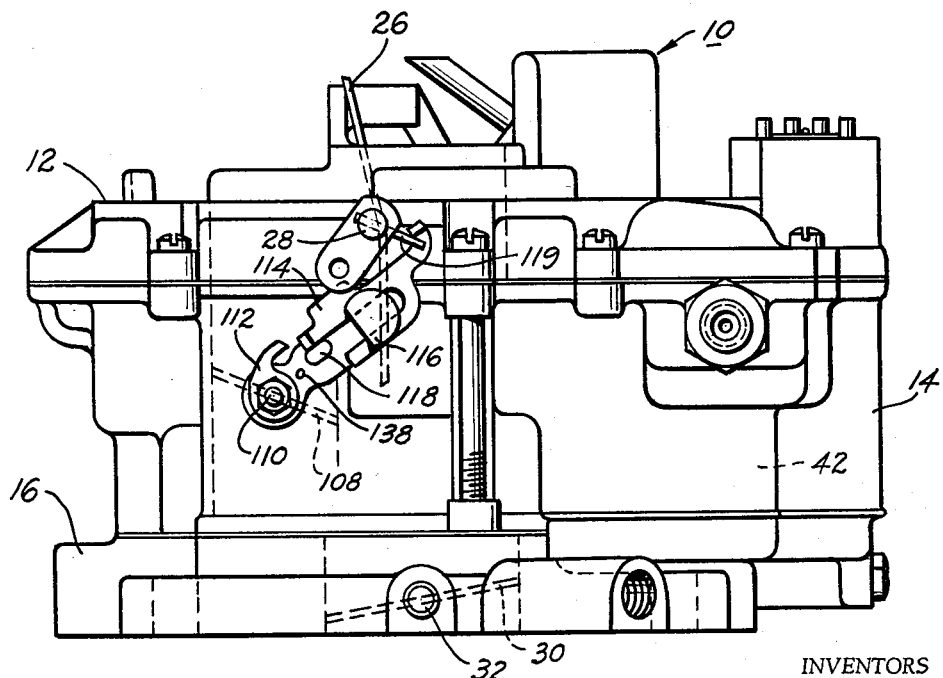

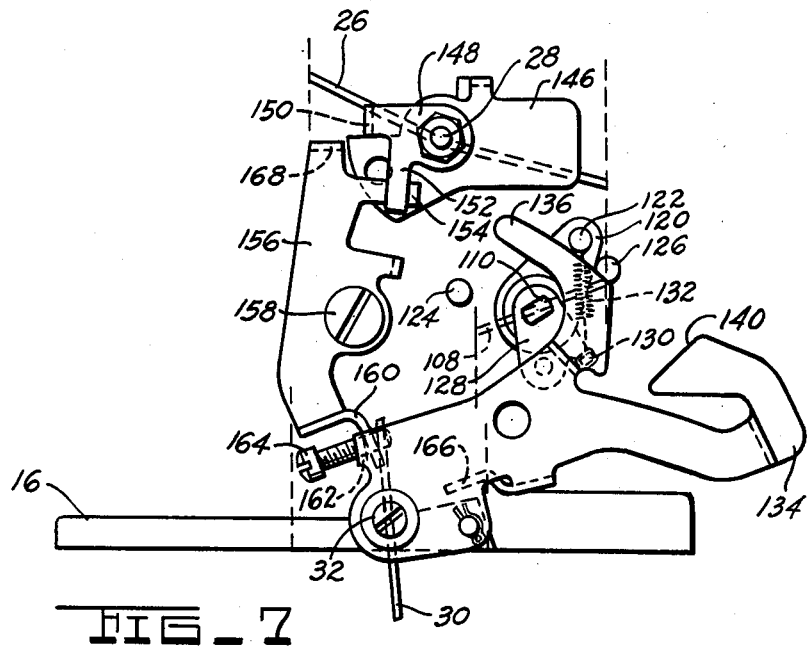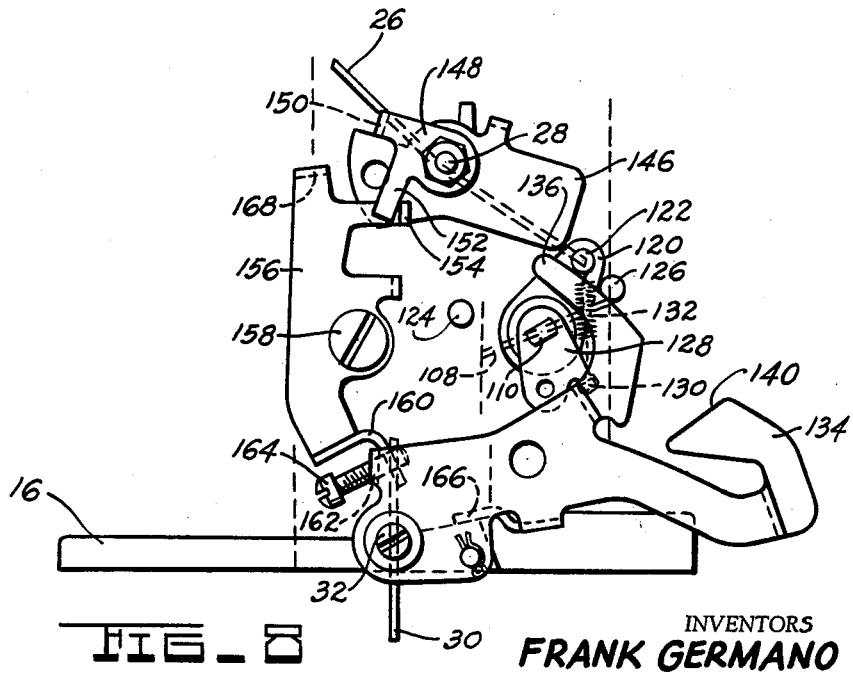

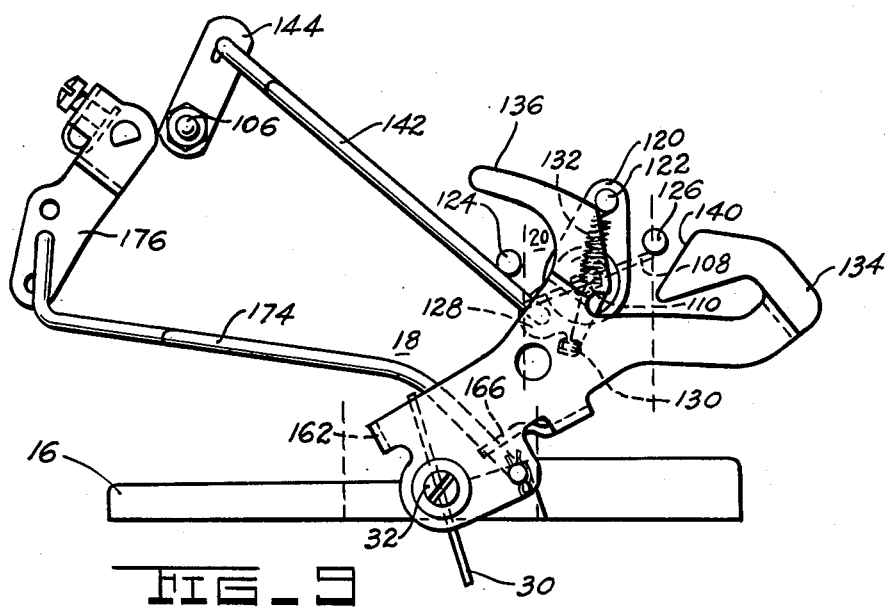
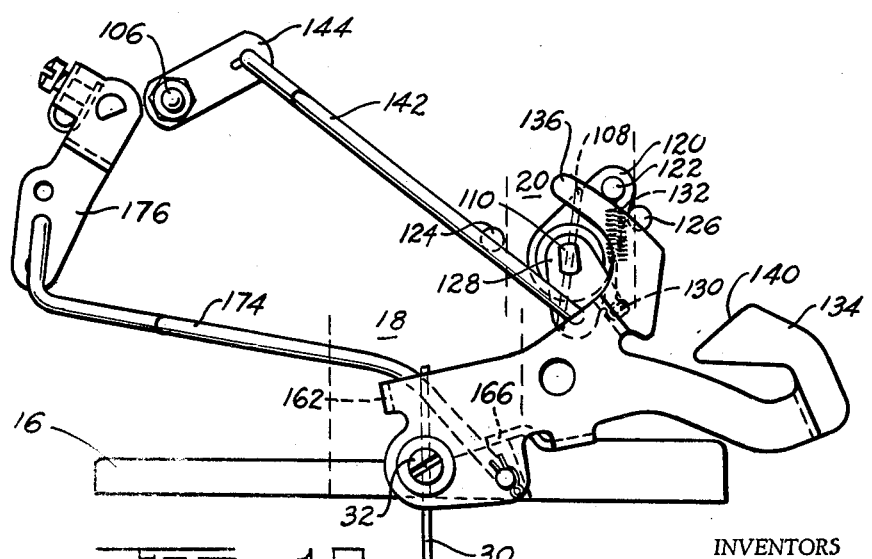

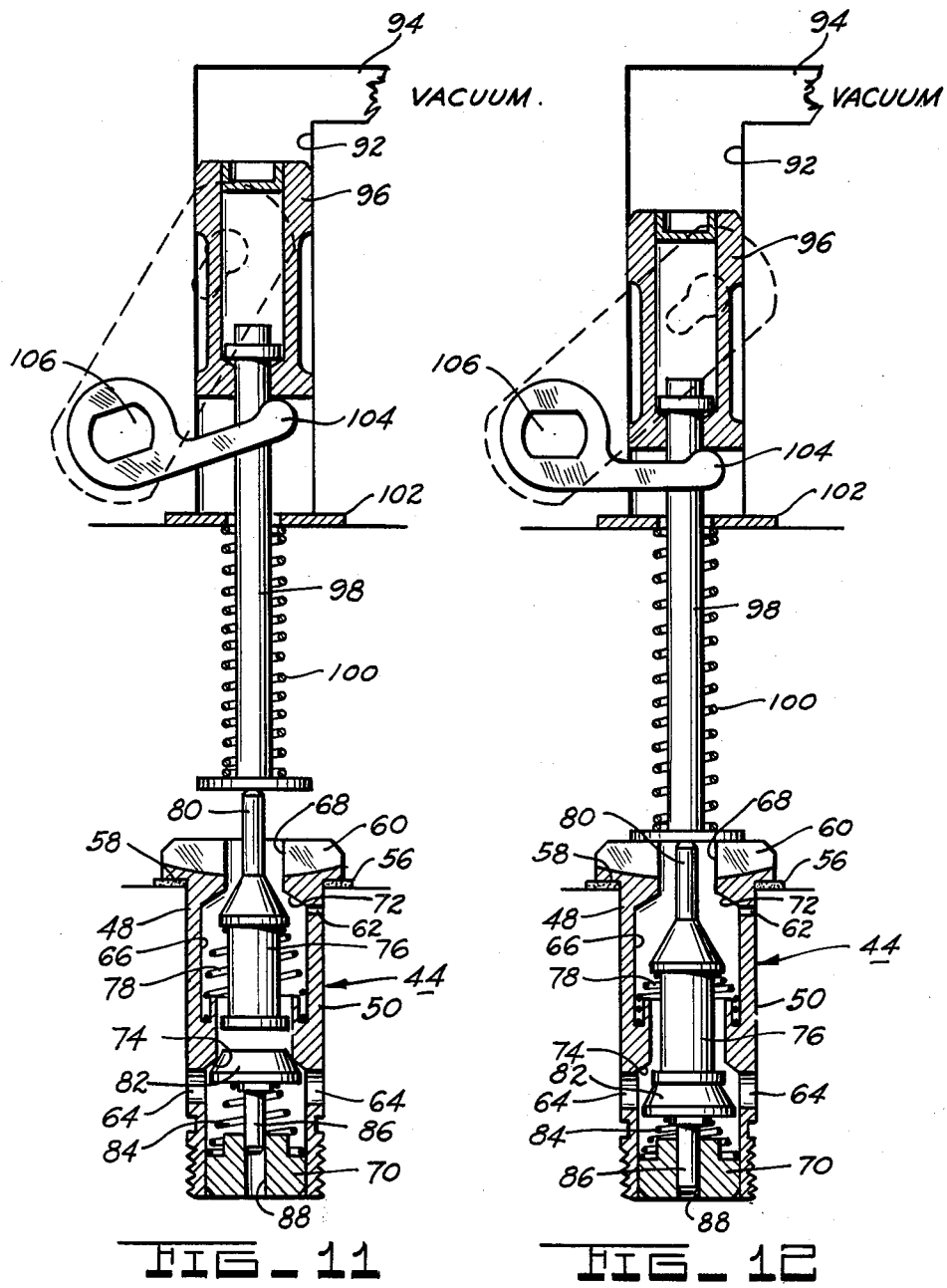

United States Patent Office 2,922,629
Patented Jan. 26, 1960

2,922,629

CARBURETOR

Frank Germano and Albert H. Winkler, Elmira, N.Y., assignors to Bendix Aviation Corporation, South Bend, Ind., a corporation of Delaware Application May 16, 1958, Serial No. 735,715

10 Claims. (Cl. 261—41)

The present invention relates to carburetors for internal combustion engines and more particularly to carburetors of the multi-stage type for such engines.

In order to obtain best economy of operation and best performance at low and intermediate speed and load conditions of engine operation it is necessary that the induction passage be relatively small to provide necessary air velocities through the passage for good metering and atomization of the fuel. An induction passage designed for best economy and performance at low and intermediate range of engine operation is normally, however, too restrictive to air flow to permit the engine to develop maximum speed and power.

It has previously been proposed to reconcile the conflicting requirements of low and intermediate speed operation with the requirements of maximum speed operation through the use of a multi-stage or 4-barrel carburetor wherein a primary carburetor is utilized to supply the engine requirements for low and intermediate conditions of engine operation and a secondary carburetor is utilized to supply a supplementary fuel-air mixture for high and/or maximum conditions of engine operation. The multi-stage carburetors used in modern automobile engines are, however, relatively complex and expensive; and considerable difficulty has been experienced in correlating the operation of the secondary system with the primary system to provide satisfactory engine performance and economy of operation.

It is an object of the present invention to provide a multi-stage carburetor having relatively few parts and simple, reliable control means for supplying the fuel-air mixture requirements of an engine throughout its operating range.

Another object of the invention is to provide in a multi-stage carburetor improved means for correlating the operation of the stages.

Other objects and advantages of the invention will become apparent from the following description taken in connection with the accompanying drawings, in which:

Figure 1 is a top view of a carburetor embodying the present invention;

Figure 2 is a view of the left side of the carburetor shown in Figure 1;

Figure 3 is a view of the right side of the carburetor shown in Figure 1;

Figure 4 is a sectional view taken along line 4—4 of Figure 1;

Figure 5 is a sectional view taken along line 5—5 of Figure 1;

Figure 6 is a fragmentary view of Figure 3 showing the levers in a different operative position;

Figures 7, 8, 9 and 10 show the levers illustrated in Figure 2 in various operative positions; and Figures 11 and 12 are enlarged views with certain parts rearranged showing the economizer of Figure 4 in different operative positions.

Referring now to the drawings there is shown a carburetor 10 having an air horn 12, main body 14 and throttle body 16. Primary and secondary induction passages 18 and 20 respectively are formed in the main body 14 and are provided with a common inlet 22 and a common outlet 24 located respectively in the air horn 12 and throttle body 16. A choke valve 26 is mounted on a shaft 28 in the air horn 12 to control the air flow through inlet 22. The choke valve may be controlled manually or by suitable automatic means including temperature and/or pressure responsive means as are well known in the carburetor art. Throttle valves 30 are mounted on a shaft 32 in the throttle body 16 to control the flow of air-fuel mixture through the outlet 24.

The primary induction passage 18 is provided with a pair of large venturis 34 in which are respectively located small venturis 36. A fuel discharge nozzle or conduit 38 having metering restrictions 40 therein connect each of the small venturis 36 to a fuel bowl 42.

An economizer designated generally by numeral 44 is disposed in a well 46 located in the fuel bowl 42. A sleeve or valve seat member 48 is threadedly received in well 46 with the side walls 50 and 52 respectively of said sleeve and well being spaced apart throughout a portion of their length to define a chamber 54 therebetween. The top of chamber 54 is sealed by a gasket 56 which is compressed by the flanged top 58 of the sleeve 48. The top 58 is provided with a screwdriver slot 60 to facilitate the assembly of the sleeve 48 with well 46. Longitudinally spaced ports 62 and 64 are formed in the side wall 50 of sleeve 48 to connect chamber 54 with the internal bore 66 of sleeve 48. Bore 66 forms an inlet 68 for sleeve 48 at one end and at the other end is closed by a plug 70. A valve seat 72 is formed in bore 66 adjacent inlet 68 and another valve seat 74 is formed in bore 66 intermediate ports 62 and 64. A cylindrical valve 76 is reciprocably mounted in bore 66 and is urged into engagement with seat 72 by a spring 78. Valve 76 is formed with a stem 80 which is adapted to protrude through inlet 68 when the valve 76 is in seated position. The diameter of valve 76 is smaller than the diameter of valve seat 74 so that valve 76 may pass through seat 74 when the valve is moved in an opening direction. A valve 82 is reciprocably mounted in bore 66 and is urged into engagement with seat 74 by a spring 84. A stem 86 is formed on valve 82 for reciprocation in a bore 88 formed in plug 70.

The annular chamber 54 is connected to each of the fuel nozzles 38 posterior the restrictions 40 therein by means of calibrated passages 90.

A cylinder 92 is formed in the air horn 12 and is connected at one end to the induction passage posterior to throttle valves 30 by means of a conduit 94. A piston or movable wall 96 is mounted in cylinder 92 for movement in response to changes in induction passage pressure posterior the throttle. A plunger 98 having a lost motion connection with piston 96 is urged into engagement with valve stem 80 by means of a spring 100 which abuts a retainer 102 secured to the air horn 12. As best seen in Figures 11 and 12 an abutment member 104 mounted on a shaft 106 is disposed in the position shown in Figure 11 to engage piston 96 and thereby limit the downward travel of plunger 98.

At high vacuum (low absolute pressure) in the induction passage posterior to the throttle, piston 96 will be moved upwardly against the force of spring 100 and the economizer valves 76 and 82 will be in closed or seated position. At a predetermined induction passage pressure, spring 100 will urge plunger 98 downwardly into engagement with stem 80 to open valve 76 whereby fuel may flow from bowl 42 through inlet 68, port 62, chamber 54 and conduits 90 to the fuel nozzles 38. The abutment 104 in the position shown in Figure 11 limits the travel of plunger 98 to a position sufficient to open only valve 76. When the abutment 104 is moved, by means to be described later, to the position shown in Figure 12, plunger 98 may be urged downwardly by spring 100 sufficiently to move valve 76 into engagement with valve 84 whereby valve 84 will be opened to permit additional fuel to flow via ports 64 to chamber 54 and thence to the fuel nozzles 38 via conduits 90.

The secondary induction passage 20 is provided with an air valve 108 mounted therein on a shaft 110. A lug or lever 112 is secured to one end of shaft 110 for engagement with a latch or slide lever 114 which is slideably mounted on the main body 14 by a pin 116. Latch 114 is slideable under the influence of gravity to the position shown in Figure 6 wherein latch 114 is in engagement with lug 112 whereby the air valve 108 is prevented from opening. A boss 118 is formed on the main body to engage latch 114 and guide the movement thereof. The choke shaft 28 is provided with a rod 119 which is disposed to engage latch 114 when the choke is moved toward open position whereby latch 114 is disengaged from lug 112 when the choke is opened, as shown in Figure 3, thus permitting the air valve 108 to be opened by means to be described.

As best seen in Figures 2, 7, 8, 9 and 10 a lever 120 provided with a cam follower 122 is rotatably mounted on the end of air valve shaft 110 opposite the end carrying lug 112. Rotation of lever 120 is limited by spaced bosses 124 and 126 formed on main body 14. A lever 128 is secured to air valve shaft 110 adjacent lever 120 and is provided with a turned over ear 130. A coiled tension spring 132 is connected to cam follower 122 and ear 130. A throttle lever 134 secured to throttle shaft 32 is provided with a cam or arm 136 which is adapted to engage cam follower 122 on lever 120. As best seen in Figure 9, when the throttle valves 30 have been opened to a predetermined position, lever 120, through the engagement of cam follower 122 and cam 136, has been rotated sufficiently to cause spring 132 to pass over the axis of shaft 110 to thereby abruptly urge air valve 108 from fully closed position to fully opened position, the latter position being determined by engagement of lug 112 with a stop pin 138 (Figure 6) secured to the main body 14. With air valve 108 in opened position cam 136 may pass under cam follower 122 thereby permitting throttles 30 to move to wide open position, as best seen in Figure 10. When throttles 30 are rotated from opened position toward closed position an arm 140 formed on throttle lever 134 engages cam follower 122 to rotate lever 120 sufficiently to cause spring 132 to pass over shaft 110 at a predetermined throttle opening thereby causing air valve 108 to be snapped from opened position to closed position.

Air valve lever 128 is connected by means of a rod 142 with a lever 144 which is secured to the economizer shaft 106. With the air valve in closed position, as shown in Figure 9, the economizer abutment 104 is positioned as shown in Figure 11 to limit the economizer to a first stage of operation wherein only the first fuel valve 76 may be opened. When the air valve is moved to opened position, as shown in Figure 10, the economizer abutment 104 is positioned as shown in Figure 12 wherein first and second stages of economizer operation, respectively corresponding to opening of first fuel valve 76 and second fuel valve 82, are permitted.

A fast idle cam 146 is rotatably mounted on choke shaft 28 and is weighted to assume a slow idle position, as shown in Figure 2, under the influence of gravity. A choke lever 148 secured to choke shaft 28 is provided with an ear 150 to form a one-way connection with fast idle cam 146. A depending arm 152 on choke lever 148 is formed for engagement with an ear 154 on an intermediate lever 156 which is rotatably mounted on the main body 14 by means of a bolt 158. Intermediate lever 156 is provided with a flange 160 which is disposed to engage an arm 162 on throttle lever 134 when throttles 30 are rotated to substantially wide open position. When arm 162 engages flange 160 lever 156 is rotated in a direction to open choke valve 26 through engagement of ear 154 with arm 152 on choke lever 148 to provide for unloading of the engine.

A screw or adjustable abutment 164 is threadedly mounted in flange 160 to engage a turned over pad 166 on throttle lever 134. When the choke valve 26 is closed or substantially closed and pad 166 is moved into engagement with screw 164 an arm 168 on intermediate lever 156 is brought into engagement with fast idle cam 146 to determine the fast idle position of throttles 30.

The slow or normal idle position of throttles 30 is determined by engagement of a portion of pad 166 with a screw or adjustable abutment 170 which is threadedly mounted in a boss 172 on main body 14 as best shown in Figure 2. A rod 174 connects throttle lever 134 with a lever 176 for actuation of an accelerator pump, not shown.

In the operation of the carburetor embodying the present invention fuel is supplied from a suitable source, not shown, to the fuel bowl 42 wherein the level of the fuel is maintained by a conventional float valve, not shown. Fuel is aspirated from the fuel bowl through metering restrictions 40 and nozzles 38 for discharge into the small venturis 36 located in the primary induction passage. Fuel may also be discharged into the primary induction passage through a conventional idle system, a portion of which is shown in Figure 5 and designated by numeral 178. Under load conditions as reflected by a predetermined induction passage pressure posterior to the throttles, a supplementary quantity of fuel is supplied to the primary discharge nozzles through the first stage valve of the economizer 44.

For low and intermediate speed operation the fuel-air mixture requirements of the engine are supplied by the primary system. For high speed or load conditions the secondary system is opened to supply additional quantities of air. When the secondary system is open the abutment 104 is positioned to permit two stage operation of the economizer 44, i.e. both valves 76 and 82 may be opened, whereby supplementary fuel is supplied to the primary system to compensate for the air supplied through the secondary system.

The air valve 108 in the secondary system is snapped from fully closed position to fully opened position and vice versa by the engagement of throttle lever 134 with lever 120 when the throttle is in first and second predetermined positions. As an example, the air valve 108 and second stage valve of economizer 44 may be opened at a throttle opening corresponding to a vehicle speed of seventy-five miles per hour. In the same example the air valve and second stage economizer valve may be closed when the throttle has been returned to a smaller predetermined opening corresponding to a vehicle speed of sixty miles per hour. This arrangement prevents hunting or instability in the secondary system and also provides control over the complete speed range of the engine.

The control of the air valve is positive, reliable and simple; and the supply of auxiliary fuel is exactly correlated with the supply of auxiliary air.

It is apparent that the present invention provides a simple, reliable and relatively inexpensive means for supplying the requirements of an engine throughout its operating range.

Although only one embodiment of the invention has been shown and described, other modifications and arrangements may be made without departing from the scope of the invention.

We claim:
1. In a carburetor for an internal combustion engine having a source of fuel, primary and secondary induction passages, a common inlet and a common outlet for said passages, a choke valve controlling said inlet, a throttle controlling said outlet, a venturi in said primary passage, a control valve in said secondary passage, a shaft for said control valve, a first lever rotatably mounted on said shaft, a second lever secured to said shaft, said levers being rotatable to first and second terminal positions respectively corresponding to control valve closed and opened positions, a spring connected to said levers and adapted to urge said second lever from first terminal position to the second terminal position and vice versa when said first lever is respectively rotated to first and second predetermined positions wherein the line of action of said spring passes over the axis of said shaft, a throttle lever operatively connected to said throttle, an arm on said throttle lever adapted to engage said first lever for rotation to said second predetermined position when said throttle is opened a predetermined amount, a second arm on said throttle lever adapted to engage said first lever for rotation to said first predetermined position when said throttle is moved from said predetermined opened amount toward closed position, a conduit adapted to connect said source of fuel to said venturi, a valve in said conduit, a member responsive to induction passage pressure posterior said throttle for opening said valve, an abutment operatively connected to said second lever and formed to engage said member to limit the opening of said valve when said second lever is in said first terminal position, a lug operatively connected to said control valve shaft, and a latch operatively connected to said choke valve formed to engage said lug when said choke valve is in substantially closed position whereby said control valve is locked in closed position.

2. In a carburetor for an internal combustion engine having a source of fuel, primary and secondary induction passages, a common outlet for said passages, a throttle mounted in said outlet, a valve in said secondary passage, means for abruptly moving said valve from fully closed position to fully opened position, a lever operatively connected to said throttle and adapted to actuate said means when said throttle is opened to a predetermined position, a conduit adapted to connect said source of fuel to said primary passage, a fuel valve in said conduit, means responsive to induction passage pressure posterior to said throttle for actuating said fuel valve, an abutment operatively connected to said first mentioned valve and adapted to limit the opening of said fuel valve when said first mentioned valve is closed.

3. In a carburetor for an internal combustion engine having a source of fuel, primary and secondary induction passages, a common outlet for said passages, a throttle mounted in said outlet, an air valve in said secondary passage, a shaft for said valve, a first lever operatively connected to said shaft, a second lever operatively connected to said throttle adapted to move said first lever to valve opened position when said throttle is opened to a predetermined position, conduit means connecting said source of fuel solely to said primary passage, a fuel valve controlling the flow through said conduit means and movable to first and second opened positions, means for actuating said fuel valve in an opening direction and means operatively connected to said air valve for limiting the opening of said fuel valve to a first position when said air valve is closed.

4. In a carburetor for an internal combustion engine, primary and secondary induction passages, a common outlet for said passages, a throttle mounted in said outlet, a valve in said secondary passage, a shaft for said valve, a first lever rotatably mounted on said shaft, a second lever secured to said shaft for rotation therewith, a spring connecting said levers and adapted to urge said second lever from valve closed position to valve opened position when said first lever is rotated to a first predetermined position and to urge said second lever from valve opened position to valve closed position when said first lever is rotated to a second predetermined position, a cam follower connected to said first lever, a throttle lever operatively connected to said throttle, a cam formed on said throttle lever for engagement with said cam follower and arranged to move first lever to said first predetermined position when said throttle is moved to a predetermined opened position, and an abutment formed on said throttle lever for engagement with said cam follower and arranged to move said first lever to said second predetermined position when said throttle is moved from opened position to a predetermined partially closed position.

5. In a carburetor for an internal combustion engine, primary and secondary induction passages, a common outlet for said passages, a throttle controlling said outlet, a valve in said secondary passage, a throttle lever operatively connected to said throttle, a spring operatively connected to said valve and a lever connected to said spring and disposed for engagement with said throttle lever and adapted to abruptly urge said valve from fully closed position to fully opened position when said throttle is opened to a predetermined position.

6. In a carburetor for an internal combustion engine having a source of fuel, primary and secondary induction passages, a common outlet for said passages, a throttle controlling said outlet, means connecting said source to said primary passage, a valve in said secondary passage, a shaft for said valve, a first lever rotatably mounted on said shaft, a second lever secured to said shaft and rotatable between terminal positions corresponding to valve closed and opened positions, a spring connecting said levers and adapted to urge said second lever from one terminal position to another when said first lever is rotated to a predetermined position wherein said spring passes over the axis of said shaft, and a throttle lever operatively connected to said throttle and adapted to rotate said first lever to said predetermined position when said throttle is opened a predetermined amount.

7. In a carburetor for an internal combustion engine having a source of fuel, primary and secondary induction passages, a throttle controlling said primary passage, a venturi in said primary passage, a conduit adapted to connect said venturi to said source of fuel, an air valve in said secondary passage, a shaft for said air valve, a first lever rotatably mounted on said shaft, a second lever secured to said shaft, a spring connected to said levers and adapted to snap said second lever from air valve fully closed position to fully opened position when said first lever is rotated to a predetermined position, a throttle lever operatively connected to said throttle and adapted to rotate said first lever to said predetermined position when said throttle is opened a predetermined amount, fuel valve means in said conduit having first and second opened positions, means responsive to primary induction passage pressure posterior to said throttle for actuating said fuel valve, and means operatively connected to said first lever for limiting the opening of said fuel valve means to said first position when said air valve is in closed position.

8. In a carburetor for an internal combustion engine having a source of fuel, primary and secondary induction passages, a common outlet for said passages, a throttle controlling said outlet, an air valve in said secondary passage, a throttle lever operatively connected to said throttle, means responsive to rotation of said throttle lever to a predetermined position for abruptly moving said air valve from fully closed position to fully opened position, a fuel bowl, means adapted to connect said source to said bowl, a well in said fuel bowl, first and second spaced ports in said well, conduit means adapted to connect said ports to said primary passage, first and second valve seats in said well, first and second spaced valve members in said well adapted to respectively seat on said first and second seats to respectively close said first and second ports, a plunger movable to a first position to open said first valve and to a second position to move said first valve into engagement with said second valve to thereby open said second valve and an abutment operatively connected to said air valve adapted to engage said plunger to limit movement thereof to said first position when said air valve is closed.

9. A power enrichment device for a carburetor having an induction passage with a throttle therein comprising a fuel bowl, a well in said bowl, a sleeve in said well having a sidewall portion spaced from said well to thereby define a chamber between said sleeve and said well, first and second longitudinally spaced ports in said sleeve opening into said chamber, a conduit connecting said chamber to said induction passage, first and second spaced valves in said sleeve adapted to respectively control the flow of said first and second ports, resilient means urging said valves toward closed position, a plunger, resilient means urging said plunger into engagement with said first valve whereby said first valve is successively moved to open said first port and into engagement with said second valve for opening said second valve and port, a movable wall responsive to induction passage pressure posterior to said throttle and operatively connected to said plunger to oppose said resilient means, and means controlled by said throttle for limiting movement of said plunger to a position sufficient to open only said first valve.

10. In a carburetor for an internal combustion engine having a source of fuel, primary and secondary induction passages, a common inlet and a common outlet for said passages, a choke controlling said inlet, a throttle controlling said outlet, a venturi in said primary passage, a conduit adapted to connect said venturi with said source, a valve in said secondary passage, means resiliently connected to said valve for movement to a predetermined position to urge said valve for abrupt movement from fully closed position to fully opened position, a lever operatively connected to said throttle for moving said means to said predetermined position when said throttle is in a predetermined position and lever means controlled by said choke for restraining said valve from opening when said choke is in closed position.

References Cited in the file of this patent
UNITED STATES PATENTS

| | | |
|---|---|---|
| 1,963,458 | Beard | June 19, 1934 |
| 2,752,131 | Gretz | June 26, 1956 |
| 2,803,443 | Dillon | Aug. 20, 1957 |